(12) United States Patent
Bester et al.

(10) Patent No.: US 11,384,411 B2
(45) Date of Patent: Jul. 12, 2022

(54) RECOVERY OF URANIUM

(71) Applicant: DOW GLOBAL TECHNOLOGIES LLC, Midland, MI (US)

(72) Inventors: Jaco Bester, Terneuzen (NL); Stephane Delameilleure, Chauny (FR); Emmanuel Zaganiaris, Chauny (FR)

(73) Assignee: DOW GLOBAL TECHNOLOGIES LLC

( * ) Notice: Subject to any disclaimer, the term of this patent is extended or adjusted under 35 U.S.C. 154(b) by 218 days.

(21) Appl. No.: 16/605,646

(22) PCT Filed: May 18, 2018

(86) PCT No.: PCT/US2018/033398
§ 371 (c)(1),
(2) Date: Oct. 16, 2019

(87) PCT Pub. No.: WO2018/222414
PCT Pub. Date: Dec. 6, 2018

(65) Prior Publication Data
US 2020/0131602 A1 Apr. 30, 2020

(30) Foreign Application Priority Data
Jun. 2, 2017 (EP) ..................... 17290073

(51) Int. Cl.
*C22B 60/02* (2006.01)
(52) U.S. Cl.
CPC ............... *C22B 60/0265* (2013.01)
(58) Field of Classification Search
CPC .................................. C22B 60/0265
See application file for complete search history.

(56) References Cited

U.S. PATENT DOCUMENTS

| 4,049,769 A * | 9/1977 | Seko ..................... B01D 59/30 423/7 |
| 4,434,138 A | 2/1984 | Lee et al. |
| 8,557,201 B1 | 10/2013 | Rezkallah |
| (Continued) | | |

FOREIGN PATENT DOCUMENTS

| EP | 0132902 A2 | 2/1985 |
| GB | 774371 A * | 5/1957 ......... C22B 60/0234 |
| WO | 2014018422 A1 | 1/2014 |

OTHER PUBLICATIONS

PCT International Search Report, dated Oct. 18, 2018, for international application No. PCT/US2018/033398, filing date May 18, 2018; ISA/European Patent Office, Florian Riederer, authorized officer.

*Primary Examiner* — George Wyszomierski
(74) *Attorney, Agent, or Firm* — Carl P. Hemenway; Kenneth Crimaldi

(57) ABSTRACT

A process is provided for recovering uranium comprising
(A) bringing a solution (A) into contact with a resin (A) to produce a mixture of solution (B) and resin (B), wherein the solution (A) is an aqueous solution comprising dissolved sodium carbonate, sodium bicarbonate, or a mixture thereof, and wherein the resin (A) is a strong acid cation exchange resin that comprises one or more cationic moiety that comprises uranium and one or more cationic moiety that comprises iron, and
(B) separating the solution (B) from the resin (B).

6 Claims, 6 Drawing Sheets

(56) References Cited

U.S. PATENT DOCUMENTS

2011/0182786 A1* 7/2011 Burba, III ................. C22B 3/42
                                                      423/20
2013/0104700 A1* 5/2013 Gisch ....................... B01J 49/07
                                                      75/743

* cited by examiner

RECOVERY OF URANIUM

The process of extracting uranium from ore often involves leaching the ore with sulfuric acid to produce an acid leach solution. Often, the acid leach solution is then passed through an ion exchange resin (for example a strong base anion exchange resin). The uranium is thought to become loaded onto the resin in the form of the $[UO_2(SO_4)_3]^{4-}$ complex anion. Often the uranium is removed from the resin by eluting with sulfuric acid. The sulfuric acid eluate produced in this elution is an acidic aqueous solution that contains sulfuric acid, uranium, and impurities. A common impurity is iron. The uranium in this eluate is thought to be, at least partially, in the form of $UO_2^{2+}$.

Once this sulfuric acid eluate is produced, the problem remains of how to recover the uranium from the sulfuric acid eluate and convert the uranium into a useful form such as, for example, sodium diuranate (SDU) or ammonium diuranate (ADU). One useful method of recovering uranium involves bringing the sulfuric acid eluate into contact with a cation exchange resin to adsorb uranium on the resin, followed by removing the uranium from the resin by bringing the uranium-loaded resin into contact with an appropriate elution fluid, such as, for example, an aqueous solution of HCl or an aqueous solution of sodium sulfate. It is contemplated that uranium is adsorbed on the resin as part of a cationic species such as, for example, $UO_2^{2+}$. One difficulty with such methods is that iron, a common contaminant in uranium, is adsorbed onto the resin and then eluted along with the uranium. It is desired to provide a process for recovering uranium that also separates the iron from the uranium.

U.S. Pat. No. 4,434,138 describes a process for recovering plutonium that includes loading plutonium onto a strong acid cation exchange resin and then removing the plutonium from the resin by elution with an aqueous solution of HI. It is desired to provide a process that is effective at recovering uranium while also separating iron from the uranium.

The following is a statement of the invention.

A first aspect of the present invention is a process for recovering uranium comprising
  (A) bringing a solution (A) into contact with a resin (A) to produce a mixture of solution (B) and resin (B), wherein the solution (A) is an aqueous solution comprising dissolved sodium carbonate, sodium bicarbonate, or a mixture thereof, and wherein the resin (A) is a strong acid cation exchange resin that comprises one or more cationic moiety that comprises uranium and one or more cationic moiety that comprises iron, and
  (B) separating the solution (B) from the resin (B).

The following is a brief description of the drawings.

Figure 1:
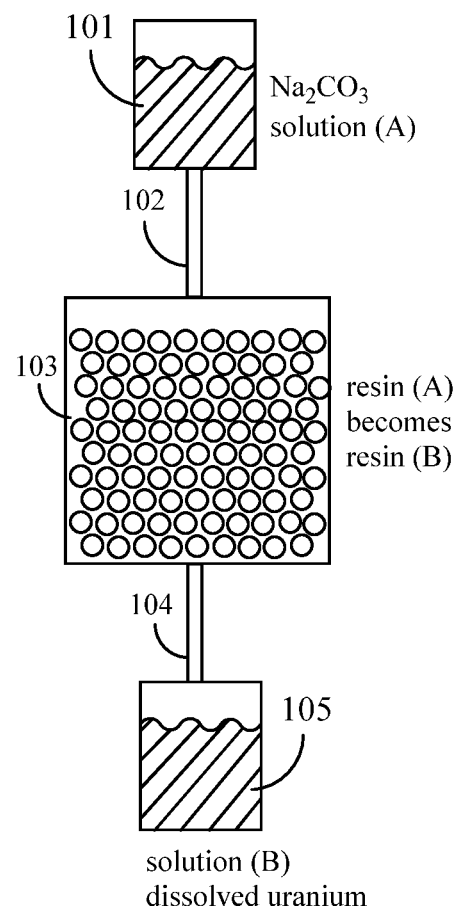
FIG. 1 shows a flow chart of an embodiment of step (A) and step (B) in which a solution (A) of $Na_2CO_3$ is passed through a fixed bed of particles of resin (B).

The following is a detailed description of the invention.

As used herein, the following terms have the designated definitions, unless the context clearly indicates otherwise.

As used herein, an aqueous solution is a solution of one or more compound dissolved in a solvent, where the solvent contains water, and where the solution contains 50% or more water by weight.

"Resin" as used herein is a synonym for "polymer." A "polymer," as used herein is a relatively large molecule made up of the reaction products of smaller chemical repeat units. Polymers may have structures that are linear, branched, star shaped, looped, hyperbranched, crosslinked, or a combination thereof; polymers may have a single type of repeat unit ("homopolymers") or they may have more than one type of repeat unit ("copolymers"). Copolymers may have the various types of repeat units arranged randomly, in sequence, in blocks, in other arrangements, or in any mixture or combination thereof. Polymers have weight-average molecular weight of 2,000 or more.

Molecules that can react with each other to form the repeat units of a polymer are known herein as "monomers." The repeat units so formed are known herein as "polymerized units" of the monomer.

Vinyl monomers have a non-aromatic carbon-carbon double bond that is capable of participating in a free-radical polymerization process. Vinyl monomers have molecular weight of less than 2,000. Vinyl monomers include, for example, styrene, substituted styrenes, dienes, ethylene, ethylene derivatives, and mixtures thereof. Ethylene derivatives include, for example, unsubstituted and substituted versions of the following: vinyl acetate and acrylic monomers. Acrylic monomers are monomers selected from substituted and unsubstituted (meth)acrylonitrile, (meth)acrylic acid, alkyl esters of (meth)acrylic acid, amides of (meth)acrylic acid, vinyl chloride, halogenated alkenes, and mixtures thereof. As used herein, the prefix "(meth)acryl-" means either acryl- or methacryl-. "Substituted" means having at least one attached chemical group such as, for example, alkyl group, alkenyl group, vinyl group, hydroxyl group, alkoxy group, carboxylic acid group, other functional groups, and combinations thereof.

As used herein, vinyl aromatic monomers are vinyl monomers that contain one or more aromatic ring.

A monovinyl monomer is a vinyl monomer that has exactly one non-aromatic carbon-carbon double bond per molecule. A multivinyl monomer is a vinyl monomer that has two or more non-aromatic carbon-carbon double bonds per molecule.

Vinyl monomers are considered to form polymers through a process of vinyl polymerization, in which the carbon-carbon double bonds react with each other to form a polymer chain.

A polymer in which 90% or more of the polymerized units, by weight based on the weight of the polymer, are polymerized units of one or more vinyl monomers is a vinyl polymer. A vinyl aromatic polymer is a polymer in which 50% or more of the polymerized units, by weight based on the weight of the polymer, are polymerized units of one or more vinyl aromatic monomer.

A resin is considered herein to be crosslinked if the polymer chain has sufficient branch points to render the polymer not soluble in any solvent. When it is said herein that a polymer is not soluble in a solvent, it means that less than 0.1 gram of the resin will dissolve in 100 grams of the solvent at 25° C.

A resin is considered herein to be a strong acid cation exchange resin (SAC resin) if 50 mole % or more of the polymerized units contain one or more sulfonate group covalently bonded to that polymerized unit. The sulfonate group may be attached to the monomer prior to polymerization or may be added to the polymerized unit after polymerization. The sulfonate group may be in protonated form, in a neutralized form involving one or more cations other than $H^+$, in ionic form, or in a mixture thereof. An SAC resin is said herein to be in "protonated form" if 90 mole % or more of the sulfonate groups attached to the resin are in protonated form.

The sulfonate groups of an SAC resin are considered to be associated with cationic moieties. A cationic moiety has a positive charge of +n, where n is 1 or higher. A cationic moiety may be a single atom in ionic form such as, for example, $H^+$, $Na^+$, or $Ca^{2+}$, or a cationic moiety may be a more complicated structure such as, for example, an oxide such as, for example, $UO_2^{2+}$ or a cationic metal coordination complex. The SAC resin is considered herein to comprise the cationic moieties associated with the sulfonate groups of the resin. A cationic moiety having charge of +n will be associated with n sulfonate groups.

A resin is considered herein to be a strong base anion exchange resin (SBA resin) if 50 mole % or more of the polymerized units contain one or more quaternary ammonium group covalently bonded to that polymerized unit. The quaternary ammonium group may be attached to the monomer prior to polymerization or may be added to the polymerized unit after polymerization. The quaternary ammonium group may be in hydroxide form, in a neutralized form involving one or more anions other than $OH^-$, in ionic form, or in a mixture thereof.

A collection of particles is characterized by the diameters of the particles. If a particle is not spherical, the diameter of the particle is considered to be the diameter of a particle having the same volume as the particle. A collection of particles is characterized herein by the volume-average diameter of the collection.

Resins may be characterized by the average pore diameter, which is measured by the BET method. As used herein, a "gel" resin has average pore diameter of 10 nm or less. As used herein, a "macroporous" resin has average pore diameter of greater than 10 nm.

As used herein, "sulfuric acid" refers to $H_2SO_4$.

When it is stated herein that a solution contains a particular dissolved ionic species, it is to be understood that the solution may or may not contain one or more ionic species of the same charge as the particular ionic species, and it is to be understood that the solution will contain sufficient ionic species of the charge opposite to the particular ionic species in order to achieve balance of electrical charges.

It is to be understood herein that a statement that a solution contains a particular dissolved compound means that that particular compound dissolves in the solution in the normal way, whether that particular compound dissolves in the form of a complete neutral molecule or whether that particular compound dissolves by forming one or more cation and one or more anion, each of which dissolves separately.

As used herein, an organic solvent is a compound that contains carbon atoms and that is liquid over a temperature range that includes 15° C. to 25° C.

When a ratio is said herein to be X:1 or greater, it is meant that the ratio is Y:1, where Y is greater than or equal to X. For example, if a ratio is said to be 3:1 or greater, that ratio may be 3:1 or 5:1 or 100:1 but may not be 2:1. Similarly, when a ratio is said herein to be W:1 or less, it is meant that the ratio is Z:1, where Z is less than or equal to W. For example, if a ratio is said to be 15:1 or less, that ratio may be 15:1 or 10:1 or 0.1:1 but may not be 20:1.

In the following, various resins are described. Each resin normally contains some water. Each resin independently preferably contains water in an amount, by weight based on the total weight of the resin, 1% to 60%.

The process of the present invention involves step (A), which is bringing solution (A) into contact with resin (A).

Solution (A) is an aqueous solution that contains dissolved sodium carbonate ($Na_2CO_3$) or dissolved sodium bicarbonate ($NaHCO_3$) or a mixture thereof. Preferred is sodium carbonate. Preferably, when sodium carbonate is used, the amount of sodium carbonate in solution (A) is, by weight based on the weight of solution (A), 1% or more; more preferably 2% or more; more preferably 4% or more. Preferably, when sodium carbonate is used, the amount of sodium carbonate in solution (A) is, by weight based on the weight of solution (A), 25% or less; more preferably 20% or less; more preferably 15% or less; more preferably 10% or less. Preferably, when sodium bicarbonate is used, the amount of sodium bicarbonate in solution (A) is, by weight based on the weight of solution (A), 0.1% or more; more preferably 0.3% or more; more preferably 1% or more; more preferably 3% or more. Preferably, when sodium bicarbonate is used, the amount of sodium bicarbonate in solution (A) is, by weight based on the weight of solution (A), 10% or less; more preferably 8% or less. Preferably the pH of solution (A) is 8 or higher; more preferably 10 or higher.

Preferably, the amount of water plus the amount of dissolved sodium carbonate in solution (A) plus the amount of sodium bicarbonate dissolved in solution (A) is, by weight based on the weight of solution (A), 90% or more; more preferably 95% or more; more preferably 99% or more. Resin (A) is a strong acid cation exchange resin. The mole percent of polymerized units of resin (A) that contains one or more sulfonate groups is 50% or more; preferably 60% or more; more preferably 70% or more; more preferably 80% or more; more preferably 90% or more. Preferably, the mole percent of polymerized units of resin (A) that contains one or more nitrogen-containing groups is 5% or less; more preferably 2% or less; more preferably 1% or less; more preferably zero. Preferably, The mole percent of polymerized units of resin (A) that contains one or more phosphorous-containing groups is 5% or less; more preferably 2% or less; more preferably 1% or less; more preferably zero. Preferably, The mole percent of polymerized units of resin (A) that contains one or more carboxyl groups is 5% or less; more preferably 2% or less; more preferably 1% or less; more preferably zero.

Preferably, resin (A) is a vinyl aromatic polymer. Preferred vinyl aromatic monomers are styrene and divinyl benzene. Preferably, the amount of polymerized units of one or more vinyl aromatic monomer is, by weight based on the weight of the polymer, 75% or more; more preferably 90% or more; more preferably 95% or more. Preferably, resin (A) contains polymerized units of one or more multivinyl monomer. Preferably, the amount of polymerized units multivinyl monomer is, by weight based on the weight of resin (A), 2% or more; more preferably 4% or more; more preferably 8% or more; more preferably 10% or more; more preferably 12% or more; more preferably 14% or more. Preferably, the amount of polymerized units multivinyl monomer is, by weight based on the weight of resin (A), 30% or less; more preferably 25% or less. Preferably, resin (A) is made by a process that includes polymerizing a monomer or mixture of monomers that contains one or more monomers that are vinyl aromatic monomers that contain only carbon and hydrogen atoms, and then, after completion of the polymerization, performing one or more chemical reactions to attach one or more sulfonate groups to the aromatic rings in the polymer.

Preferably the resin (A) is in the form of a collection of particles. Preferably the particles contain crosslinked polymer. Preferably the volume-average diameter of the collection of particles is 50 μm or more; more preferably 100 μm or more. Preferably the volume-average diameter of the collection of particles is 1,000 μm or less.

Preferably, before resin (A) is brought into contact with solution (A), the amount of uranium in any form, characterized as grams of elemental uranium per liter of resin, in resin (A) is 6 g/L or more; more preferably 10 g/L or more; more preferably 15 g/L or more; more preferably 20 g/L or more. Preferably, before resin (A) is brought into contact with solution (A), the amount of uranium in any form, characterized as grams of elemental uranium per liter of resin, in resin (A) is 100 g/L or less; more preferably 80 g/L or less; more preferably 60 g/L or less. The uranium in resin (A) is part of a cationic moiety that is associated with one or more sulfonate groups. It is contemplated that 50 mole percent or more of the uranium atoms are present as $UO_2^{2+}$.

Preferably, before resin (A) is brought into contact with solution (A), the amount of iron in any form, characterized as grams of elemental iron per liter of resin, in resin (A) is 1 g/L or more; more preferably 3 g/L or more; more preferably 5 g/L or more; more preferably 7 g/L or more. Preferably, before resin (A) is brought into contact with solution (A), the amount of iron in any form, characterized as grams of elemental iron per liter of resin, in resin (A) is 50 g/L or less; more preferably 40 g/L or less; more preferably 30 g/L or less; more preferably 20 g/L or less. The iron in resin (A) is part of a cationic moiety that is associated with one or more sulfonate groups.

The steps of bringing solution (A) into contact with resin (A) and then separating solution (B) from resin (B) may be accomplished by any method. A preferred method is to provide a fixed bed of particles of resin (A) and then pass solution (A) through the fixed bed of particles of resin (A).

The solution that exits the fixed bed (or is otherwise separated from resin (B)) is solution (B). It is contemplated that solution (B) contains one or more dissolved material that contains uranium. To characterize the amount of uranium in solution (B), it is useful to collect the aggregate of all of the solution (B) that exits the fixed bed or is otherwise separated from resin (B) and to consider the "U extraction ratio," which is the mole ratio of the total of all atoms of uranium in any form in the aggregate of solution (B) to the total of all atoms of uranium in any form that were present on resin (A) prior to contact with solution (A). Preferably the U extraction ratio is 0.5:1 or greater; more preferably 0.6:1 or greater; more preferably 0.7:1 or greater; more preferably 0.8:1 or greater; more preferably 0.9:1 or greater.

Preferably, the process of passing solution (A) through the fixed bed of resin (A) is continued until the time when the uranium concentration in solution (B) begins to fall. For example, the instantaneous concentration of uranium may be measured as a function of time as solution (B) exits the fixed bed, and the maximum concentration may be noted. The time may be noted when the ratio of the instantaneous concentration of uranium in solution (B) as it exits the fixed bed to the maximum concentration is 0.1:1 or lower. At that time, the flow of solution (A) is preferably halted. At that time, resin (A) is considered to be depleted of uranium, and the depleted resin (A) is known herein as resin (B). Preferably, the amount of uranium, as elemental uranium, in resin (B) is 5 gram per liter of resin (g/L) or less; more preferably 1 g/L or less; more preferably 0.2 g/L or less.

Preferably, the amount of iron in any form, characterized as grams of elemental iron per liter of resin, in resin (B) is 1 g/L or more; more preferably 3 g/L or more; more preferably 5 g/L or more; more preferably 7 g/L or more. Preferably, the amount of iron in any form, characterized as grams of elemental iron per liter of resin, in resin (B) is 50 g/L or less; more preferably 40 g/L or less; more preferably 30 g/L or less; more preferably 20 g/L or less. It is expected that the iron in resin (B) is part of a cationic moiety that is associated with one or more sulfonate groups.

One embodiment of step (A) and step (B) is shown in FIG. 1.

It is useful to contemplate steps that may optionally be performed prior to step (A). In some embodiments, resin (A) contains some sulfonate groups that are associated with $H^+$ cations. In some of such embodiments, the resin (A) may be used directly in step (A) as described above. When such a resin (A) is used directly in step (A), it is expected that some of the carbonate ions could react with water and with $H^+$ cations to form, among other products, carbon dioxide gas, and it may be desirable to make provisions in the equipment to allow for the escape of the carbon dioxide gas without undue buildup of pressure. Alternatively and preferably, prior to step (A), the resin may be subjected to a process, herein called steps (W) and (X), that are expected to replace some or all of the $H^+$ cations on the resin with other cations. Then, when the resin is later used in step (A), carbon dioxide production is reduced or eliminated.

Step (W) brings resin (W) into contact with solution (W). The suitable and preferred polymer composition and particle diameter for resin (W) are the same as those discussed above for resin (A).

Solution (W) has pH of 8 or higher. Solution (W) preferably is an aqueous solution that contains dissolved $NH_4OH$ or MOH, where M is an alkali metal, or a mixture thereof. Preferably M is sodium or potassium, more preferably sodium. When MOH is used, preferably the concentration of MOH in water, by weight based on the weight of solution (W) is 0.2% or higher; more preferably 0.5% or higher. When MOH is used, preferably the concentration of MOH in water, by weight based on the weight of solution (W) is 5% or lower; more preferably 3% or lower. When $NH_4OH$ is used, preferably the concentration of $NH_4OH$ is, by weight based on the weight of solution (W), 0.5% or higher; more preferably 1% or higher. When $NH_4OH$ is used, preferably the concentration of $NH_4OH$ is, by weight based on the weight of solution (W), 8% or lower; more preferably 5% or lower.

The total amount of solution (W) may be characterized by the ratio of the total volume of solution (W) to the volume of resin (W) prior to contact with solution (W). Preferably that ratio is 1:1 or higher; more preferably 2:1 or higher; more preferably 3:1 or higher. Preferably that ratio is 20:1 or lower; more preferably 10:1 or lower.

After step (W), step (X) is performed, in which the resin and the solution are separated from each other. After separation, the resin is labeled resin (X). Resin (X) is preferably suitable for use as resin (A). Optionally, additional operations may be performed on resin (X) prior to its use as resin (A), such as, for example, washing resin (X) with water.

The steps of bringing solution (W) into contact with resin (W) and then separating solution (X) from resin (X) may be accomplished by any method. A preferred method is to provide a fixed bed of particles of resin (W) and then pass solution (W) through the fixed bed of particles of resin (II). The solution that exits from the fixed bed will be solution (X). Preferably, the process of passing solution (W) through the fixed bed of resin (W) is continued until the time when the concentration or either $NH_4^+$ or $M^+$ in solution (X) (depending on which cation had been present in solution (W)) begins to rise. It is expected that as the instantaneous concentration of either $NH_4^+$ or $M^+$ in solution (X) rises, the instantaneous pH of solution (X) will also rise. For example the instantaneous pH value may be measured as a function of time as solution (X) exits the fixed bed. The time may be noted when the instantaneous pH is greater than 8 or preferably greater than 9 or preferably greater than 10. At that time, the flow of solution (W) is preferably halted.

Preferably, after step (X), the resin (X) that is separated from the mixture is suitable as resin (A), as described above. Preferably, after step (X), resin (X) has an amount of $H^+$ cations that are associated with sulfonate groups, as a mole ratio of $H^+$ cations to sulfonate groups, or 0.1:1 or less; more preferably 0.05:1 or less; more preferably 0.01:1 or less.

Figure 2:
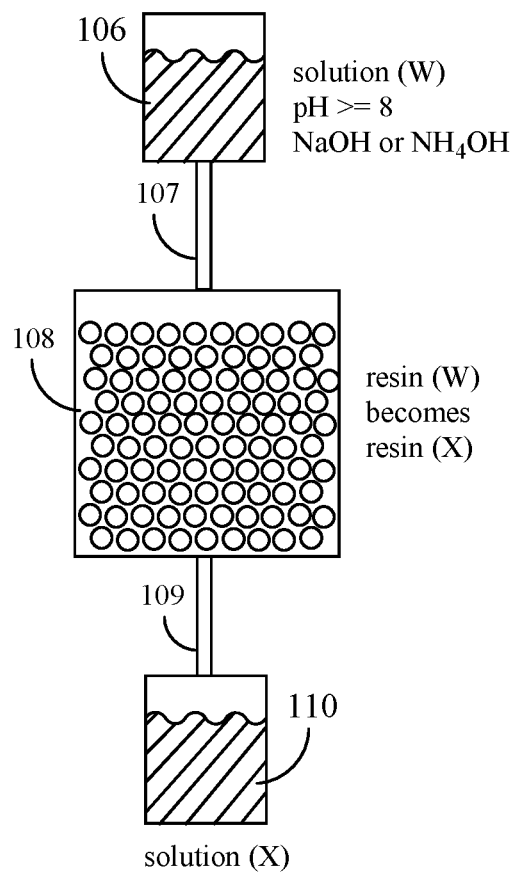
FIG. 2 shows a flow chart of an embodiment of step (W) and step (X) (as defined below) in which a solution (W) of pH of 8 or higher is passed through a fixed bed of particles of resin (W).

An embodiment of step (W) and step (X) is shown in FIG. 2.

It is also useful to contemplate how resin (A) or resin (W) is prepared. Preferably resin (A) or resin (W) is prepared by steps (R) and (S) as follows. Step (R) involves bringing into contact resin (R) and solution (R) to form a mixture. Step (S) involves separating the mixture into resin (S) and solution (S). Resin (S) is suitable, optionally after additional steps such as, for example, washing with water, for use as either resin (W) or resin (A).

Solution (R) is an aqueous solution that contains uranium and dissolved sulfuric acid. Preferably, the concentration of uranium in solution (R), as elemental uranium, is preferably 1 g/L or more; more preferably 2 g/L or more. Preferably, the concentration of uranium in solution (R), as elemental uranium, is 50 g/L or less; more preferably 20 g/L or less; more preferably 10 g/L or less. Preferably, solution (R) contains dissolved sulfuric acid in an amount of 30 g/L or more; more preferably 40 g/L or more. Preferably, solution (R) contains dissolved sulfuric acid in an amount of 200 g/L or less; more preferably 100 g/L or less. Preferably the pH of solution (R) is 2 or less.

In the process of the present invention, solution (R) is brought into contact with resin (R). Resin (R) is a strong acid cation exchange resin. The mole percent of polymerized units of resin (R) that contains one or more sulfonate groups is 50% or more; preferably 60% or more; more preferably 70% or more; more preferably 80% or more; more preferably 90% or more. Preferably, The mole percent of polymerized units of resin (R) that contains one or more nitrogen-containing groups is 5% or less; more preferably 2% or less; more preferably 1% or less; more preferably zero. Preferably, The mole percent of polymerized units of resin (R) that contains one or more phosphorous-containing groups is 5% or less; more preferably 2% or less; more preferably 1% or less; more preferably zero. Preferably, The mole percent of polymerized units of resin (R) that contains one or more carboxyl groups is 5% or less; more preferably 2% or less; more preferably 1% or less; more preferably zero.

Some examples of commercial resins that are suitable as resin (R) are AMBERJET™ 1600H, AMBERLITE™ 200, AMBERSEP™ 200, AMBERLYST™ 35Wet, and AMBERLYST™ 40Wet; among these three resins, AMBERLYST™ 35Wet is preferred.

Preferably, resin (R) is a vinyl aromatic polymer. Preferred vinyl aromatic monomers are styrene and divinyl benzene. Preferably, the amount of polymerized units of one or more vinyl aromatic monomer is, by weight based on the weight of the polymer, 75% or more; more preferably 90% or more; more preferably 95% or more. Preferably, resin (R) contains polymerized units of one or more multivinyl monomer. Preferably, the amount of polymerized units multivinyl monomer is, by weight based on the weight of resin (R), 2% or more; more preferably 4% or more; more preferably 8% or more; more preferably 10% or more; more preferably 12% or more; more preferably 14% or more. Preferably, the amount of polymerized units multivinyl monomer is, by weight based on the weight of resin (R), 30% or less; more preferably 25% or less. Preferably, resin (R) is made by a process that includes polymerizing a monomer or mixture of monomers that contains one or more monomers that are vinyl aromatic monomers that contain only carbon and hydrogen atoms, and then, after completion of the polymerization, performing one or more chemical reactions to attach one or more sulfonate groups to the aromatic rings in the polymer.

Preferably the resin (R) is in the form of a collection of particles. Preferably the particles contain crosslinked polymer. Preferably the volume-average diameter of the collection of particles is 50 μm or more; more preferably 100 μm or more. Preferably the volume-average diameter of the collection of particles is 1,000 μm or less.

Preferably, before resin (R) is brought into contact with solution (R), the amount of uranium in any form, characterized as grams of elemental uranium per liter of resin, in resin (R) is 5 g/L or less; more preferably 1 g/L or less; more preferably 0.2 g/L or less.

Preferably, before resin (R) is brought into contact with solution (R), resin (R) is in protonated form.

While the present invention is not limited to any particular theory, it is contemplated that when solution (R) is brought into contact with resin (R), some or all of the $UO_2^{2+}$ cations in solution (R) will become resident on resin (R), associated with the sulfonate anions attached to the resin (R). The ion exchange reaction of loading uranium on the SAC resin is believed to be the following:

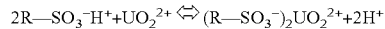

$$2R\text{—}SO_3^-H^+ + UO_2^{2+} \Leftrightarrow (R\text{—}SO_3^-)_2UO_2^{2+} + 2H^+$$

where R is the resin matrix.

Solution (R) and resin (R) are brought into contact with each other to make a mixture. It is contemplated that some alterations in the compositions of solution (R) and resin (R) will take place, for example by transfer of $UO_2^{2+}$ cations from solution (R) to resin (R). When the mixture is separated into a liquid portion and a solid portion, the liquid portion will be the altered solution (R), now labeled solution (S); and the solid portion will be the altered resin (R), now labeled resin (S). It is considered that resin (S) will be suitable as either resin (W) or resin (A), depending on whether or not optional steps (W) and (X) will be performed. Optionally, resin (S) will be subjected to optional additional steps, such as, for example, washing with water, prior to use as resin (W) or resin (A).

It is noted that resin (R) and resin (S) normally contain some water. Each of resin (R) and resin (S) each independently preferably contains water in an amount, by weight based on the total weight of the resin, 1% to 60%.

The steps of bringing solution (R) into contact with resin (R) and then separating solution (S) from resin (S) may be accomplished by any method. A preferred method is to provide a fixed bed of particles of resin (R) and then pass solution (R) through the fixed bed of particles of resin (R). The solution that exits from the fixed bed will be solution (S). Preferably the ratio of the concentration of uranium in solution (R) to the concentration of uranium in solution (S) is 10:1 or more; more preferably 50:1 or more. Preferably, the process of passing solution (R) through the fixed bed of resin (R) is continued until the time when the uranium concentration in solution (S) begins to rise, for example until the ratio of the concentration of uranium in solution (R) to the concentration of uranium in solution (S) falls below 10:1. At that time, the flow of solution (R) is preferably halted. At that time, resin (S) is considered to be "loaded" with $UO_2^{2+}$.

Preferably, the amount of dissolved compounds in solution (S) other than $H_2SO_4$ is, by weight based on the weight of solution (S), 5% or less; more preferably 2% or less; more preferably 1% or less.

Figure 3:
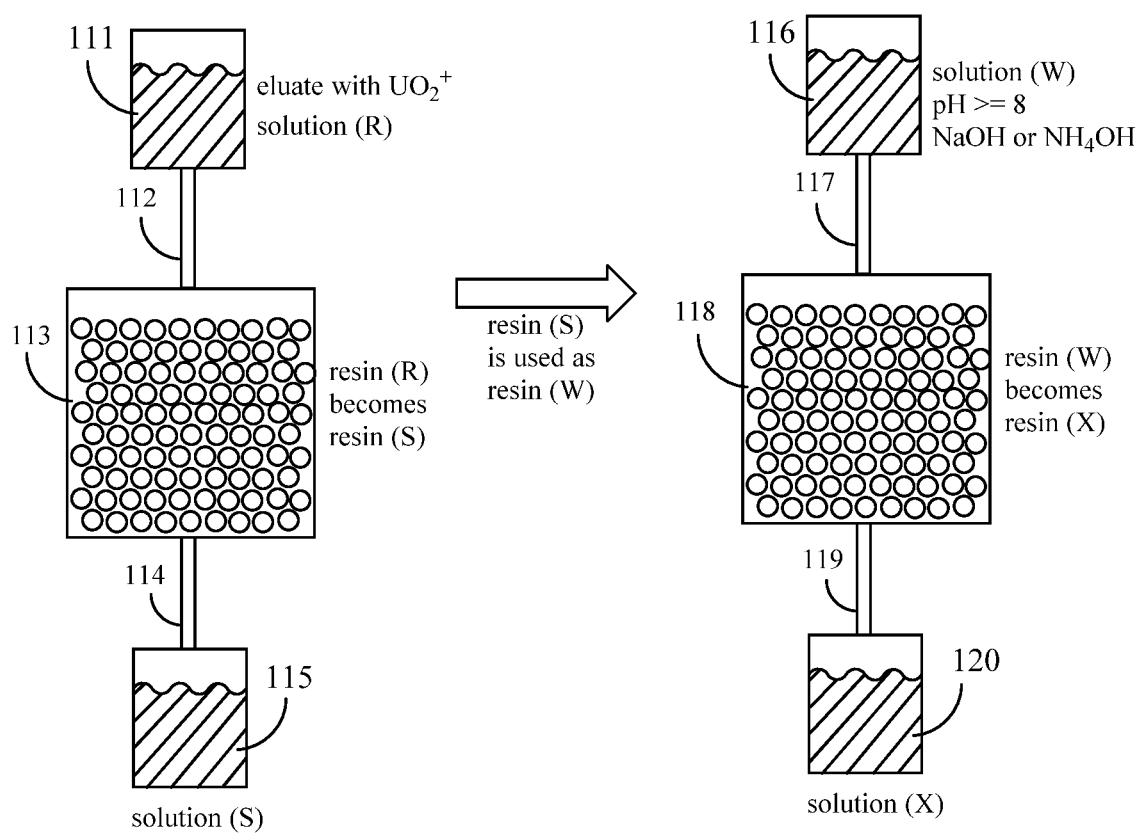
FIG. 3 shows a flow chart of an embodiment of step (R) and step (S) (as defined below) in which a solution (R) containing dissolved $UO_2^+$ is passed through a fixed bed of particles of resin (R), followed by the steps depicted in FIG. 2.
Figure 4:
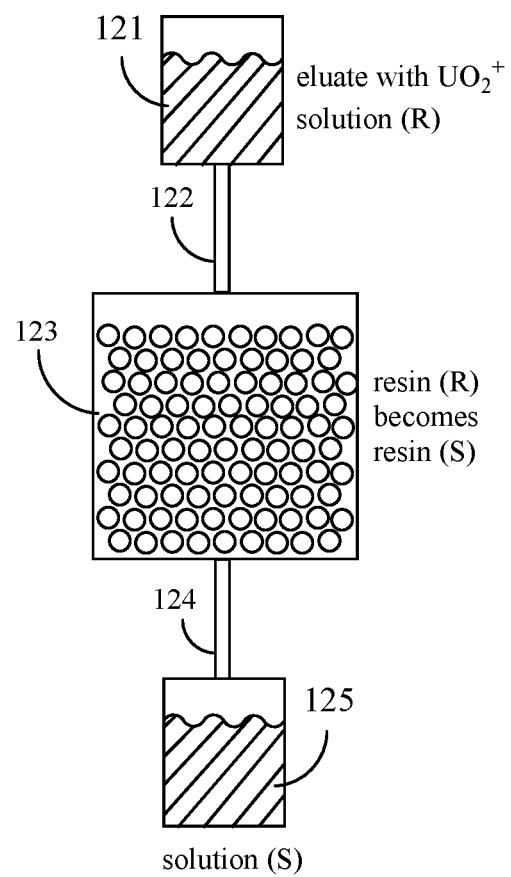
FIG. 4 shows a flow chart of an embodiment of step (R) and step (S) (as defined below) in which a solution (R) containing dissolved $UO_2^+$ is passed through a fixed bed of particles of resin (R).

An embodiment in which step (R) and step (S) are followed by step (W) and step (X) prior to step (A) is shown in FIG. 3. An embodiment in which step (R) and step (S) are followed by step (A) without performing step (W) and step (X) is shown in FIG. 4. An optional step of washing resin (S) after step (S) is not shown if FIGS. 3 and 4.

It is also useful to contemplate the origin of solution (R). The solution (R) may be formed by any process. Preferably, solution (R) is formed as follows: leaching uranium ore with sulfuric acid to produce an acid leach solution; then passing the acid leach solution through a strong base anion exchange resin to capture $[UO_2(SO_4)_3]^{4-}$ anions onto the resin; then removing the uranium from the resin by eluting with sulfuric acid to produce an eluate that contains dissolved sulfuric acid ($H_2SO_4$) and dissolved $UO_2^{2+}$ cations. The eluate may optionally be diluted with water prior to further use. The eluate or the diluted eluate is solution (R). Preferably the eluate is diluted prior to use as solution (R). Preferably, the ratio of dilution water to eluate is, by weight, 0.4:1 or more; more preferably 0.6:1 or more; more preferably 0.8:1 or more. Preferably, the ratio of dilution water to eluate is, by weight, 8:1 or less; more preferably 6:1 or less; more preferably 4:1 or less.

In addition to steps that may be taken prior to step (A), it is also useful to contemplate steps that may be taken after steps (A) and (B). Steps (A) and (B) produce resin (B), which remains loaded with iron, and solution (B), which contains dissolved uranium. Additional steps may be taken to recover the iron or the uranium or both.

Optionally, after step (B), prior to step (C) (defined below), one or more additional steps may be performed on resin (B), including, for example, washing resin (B) with water.

Preferably, after step (B), steps (C) and (D) are performed in order to remove dissolved iron from resin (B). In step (C), a solution (C) is brought into contact with the resin (B) to produce a mixture of a solution (D) and a resin (C), where the solution (C) is an aqueous solution that contains dissolved $H_2SO_4$ and, optionally, dissolved $Na_2SO_4$. In step (D), the solution (D) is separated from the resin (C).

The amount of $H_2SO_4$ in solution (C), by weight based on the weight of solution (C), is preferably 2% or more; more preferably 4% or more; more preferably 6% or more; more preferably 8% or more. The amount of $H_2SO_4$ in solution (C), by weight based on the weight of solution (C), is preferably 20% or less; more preferably 18% or less; more preferably 16% or less; more preferably 14% or less.

When $Na_2SO_4$ is used, the amount of $Na_2SO_4$ in solution (C), by weight based on the weight of solution (C), is preferably 0.1% or more; more preferably 0.5% or more. When $Na_2SO_4$ is used, the amount of $Na_2SO_4$ in solution (C), by weight based on the weight of solution (C), is preferably 20% or less; more preferably 15% or less; more preferably 10% or less.

When resin (B) contains iron in an amount of 10 grams per liter of resin, it is preferred that solution (C) contains $Na_2SO_4$.

The steps of bringing solution (C) into contact with resin (B) and then separating solution (D) from resin (C) may be accomplished by any method. A preferred method is to provide a fixed bed of particles of resin (B) and then pass solution (C) through the fixed bed of particles of resin (B). The fixed bed of resin (B) may be the same fixed bed in which resin (A) was converted to resin (B) in steps (A) and (B). The solution that exits from the fixed bed of resin (B) will be solution (D). It is expected that the first portion of solution (D) to exit from the fixed bed will have a relatively high iron content. Preferably, the process of passing solution (C) through the fixed bed of resin (B) is continued until the time when the iron concentration in solution (D) begins to fall. For example, the instantaneous concentration of iron may be measured as a function of time as solution (D) exits the fixed bed, and the maximum concentration may be noted. The time may be noted when the ratio of the instantaneous concentration of iron in solution (D) as it exits the fixed bed to the maximum concentration is 0.1:1 or lower. At that time, the flow of solution (C) is preferably halted. At that time, resin (B) is considered to be depleted of iron, and the depleted resin (B) is known herein as resin (C).

Figure 5:
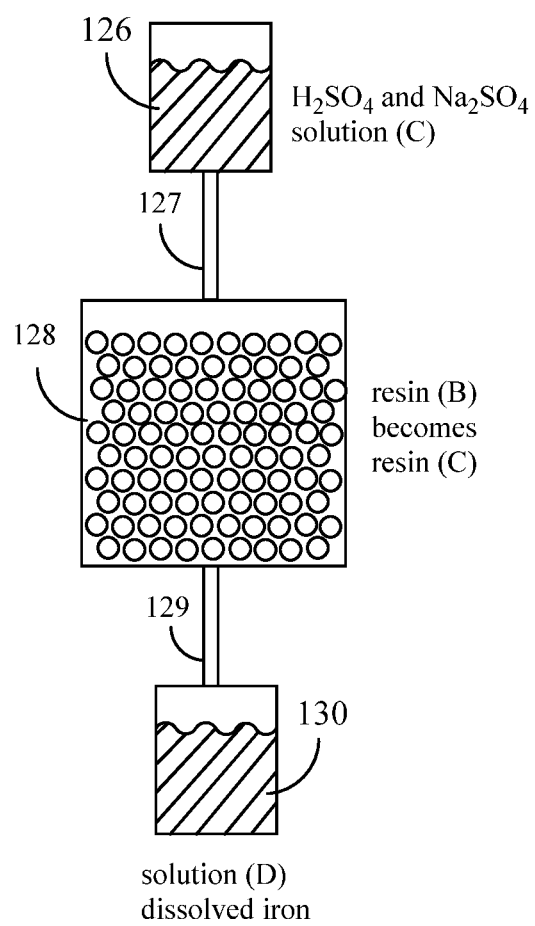
FIG. 5 shows a flow chart of an embodiment of step (C) and step (D) (as defined below) in which a solution (C) containing dissolved $H_2SO_4$ and $Na_2SO_4$ is passed through a fixed bed of particles of resin (B).

An embodiment of step (C) and step (D) is shown in FIG. 5.

Preferably, after step (B), in order to remove uranium from solution (B), steps (E) and (F) are performed. In step (E), solution (B) is brought into contact with a solution (E) to form a mixture, where solution (E) is an aqueous solution that contains a dissolved metal hydroxide or ammonium hydroxide. Preferably, when the mixture of solution (B) and solution (E) is formed, the corresponding diuranate salt precipitates. The diuranate salt is considered to be a useful form of uranium that is appropriate for various uses. Preferred metal hydroxide or ammonium hydroxide are sodium hydroxide and ammonium hydroxide, which produce precipitates of sodium diuranate (SDU) and ammonium diuranate (ADU), respectively.

Figure 6:
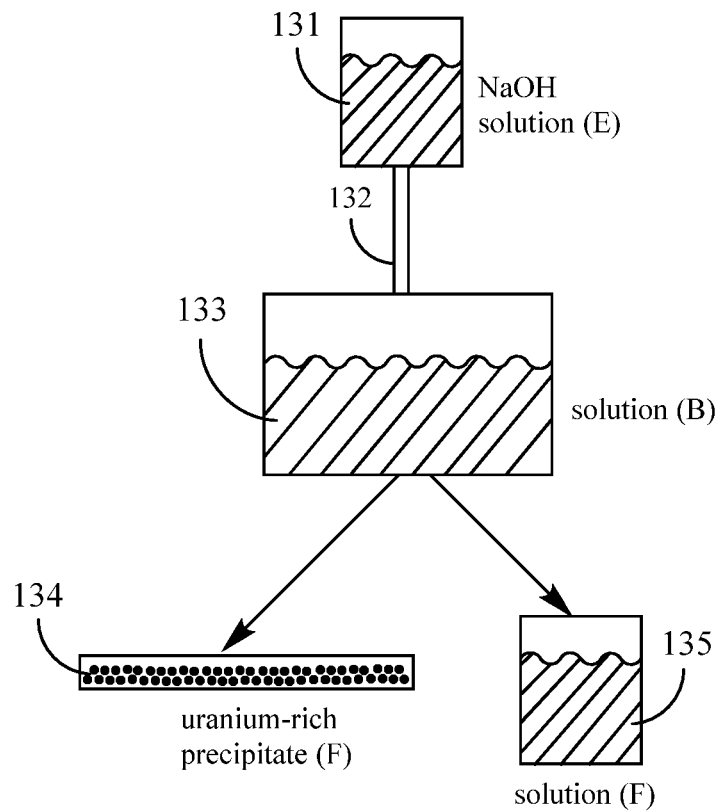
FIG. 6 shows a flow chart of an embodiment of step (E) and step (F) (as defined below) in which a solution (E) containing dissolved hydroxide is mixed with solution (B) to produce uranium-containing precipitate (F).

When step (E) is performed and the diuranate salt precipitates, a mixture is formed of the precipitated diuranate salt, herein labeled precipitate (F), and the remaining aqueous solution, herein labeled solution (F). In step (F), the precipitate (F) is separated from the solution (F). Separation may be performed by any method, including, for example, filtration, centrifiugation, and combinations thereof. Solution (F), being essentially an aqueous solution of $Na_2CO_3$, can optionally be recycled as solution (A). An embodiment of step (E) and step (F) is shown in FIG. 6.

Some specific embodiments of certain steps of the present invention are shown in the Figures. FIG. 1 shows an embodiment of step (A) and step (B). In FIG. 1, a source 101 supplies solution (A). The source may be any vessel or container. Solution (A) passes through a pipe 102 into a container 103 that holds resin (A) but allows liquid solution to pass through, after making intimate contact with resin (A). Solution (A) contains $Na_2CO_3$, and resin (A) is loaded with both uranium and iron. Solution (B) exits from container 103 via pipe 104 and is collected in container 105. As solution (A) passes through the bed of particles of resin (A), uranium transfers from resin (A) to solution (A), thereby transforming resin (A) (uranium loaded) into resin (B) (uranium removed) and transforming solution (A) (uranium free) into solution (B) (containing uranium). Most or all of the iron that was loaded on resin (A) prior to step (A) remains on resin (A) through step (A) and step (B).

FIG. 2 shows an embodiment of step (W) and step (X). These steps preferably performed immediately prior to step (A) and step (B). In FIG. 2, a source 106 supplies solution (W), which has high pH and preferably is an aqueous solution of NaOH or $NH_4OH$. The source may be any vessel or container. Solution (W) passes through a pipe 107 into a container 108 that holds resin (W) but allows liquid solution to pass through, after making intimate contact with resin (W). In the process, $H^+$ cations that had been associated with sulfonate groups on the resin are exchanged for alkali metal cations from solution (W). Solution (X) exits from container 108 via pipe 109 and is collected in container 110. After step (W) and step (X), the resin is now suitable for use as resin (A) in step (A), optionally after one or more additional operations such as, for example, washing with water.

FIG. 3 shows an embodiment of step (R) and step (S) followed by an embodiment of step (W) and step (X). Step (R) and step (S) load uranium onto the resin. In FIG. 3, a source 111 supplies solution (R), which contains dissolved $UO_2^+$. Prior to step (R), resin (R) contains little or no uranium. The source 111 may be any vessel or container. Solution (R) passes through a pipe 112 into a container 113 that holds resin (R) but allows liquid solution to pass through, after making intimate contact with resin (R). Solution (S) exits from container 113 via pipe 114 and is collected in container 115. Uranium transfers from solution (R) to resin (R), thus transforming solution (R) (uranium rich) into solution (S) (uranium poor) and transforming resin (R) (uranium poor) into resin (S) (uranium loaded). Resin (S) is then used as resin (W), optionally after one or more additional operations such as, for example, washing with water.

In FIG. 3, a source 116 supplies solution (W). The source may be any vessel or container. Solution (W) passes through a pipe 117 into a container 118 that holds resin (W) but allows liquid solution to pass through, after making intimate contact with resin (W). Solution (X) exits from container 118 via pipe 119 and is collected in container 120. Step (W) and step (X) operate as described above. After the steps shown in FIG. 3, the resin is suitable for use as resin (A), optionally after one or more additional operations such as, for example, washing with water.

FIG. 4 shows an embodiment of step (R) and step (S) performed without using step (W) and step (X). In FIG. 4, a source 121 supplies solution (R). The source may be any vessel or container. Solution (R) passes through a pipe 122 into a container 123 that holds resin (R) but allows liquid solution to pass through, after making intimate contact with resin (R), thus transforming resin (R) into resin (S). Solution (S) exits from container 123 via pipe 124 and is collected in container 125. Step (R) and step (S) operate as described above. In this embodiment, after step (S) is performed, the resin (S) is suitable to be used as resin (A) in steps (A) and (B).

FIG. 5 shows an embodiment of step (C) and step (D). In FIG. 5, a source 126 supplies solution (C). The source may be any vessel or container. Solution (C) contains $H_2SO_4$ and $Na_2SO_4$, and resin (B) is uranium poor but loaded with iron. Solution (C) passes through a pipe 127 into a container 128 that holds resin (B) but allows liquid solution to pass through, after making intimate contact with resin (B). Solution (D) exits from container 128 via pipe 129 and is collected in container 130. Iron transfers from resin (B) to solution (D), thus transforming resin (B) (loaded with iron) into resin (C) (iron poor), and transforming solution (C) (iron poor) into solution (D) (rich in dissolved iron).

FIG. 6 shows an embodiment of step (E) and step (F). In FIG. 6, a source 131 supplies solution (E). The source may be any vessel or container. Solution (E) contains NaOH or $NH_4OH$, and solution (B) is rich with dissolved uranium. When the solutions are mixed, a diuranate salt precipitates as precipitate (F), which is removed, leaving behind a uranium-poor solution (F).

The following are examples of the present invention.

PREPARATIVE EXAMPLE 1: LOADING THE RESIN (STEPS (R) AND (S))

Resin was loaded with uranium and iron as follows. Resin was placed in a chromatography column. Bed volume was 20 mL. The resin was AMBERLYST™ 35WET, a macroporous strong acid cation exchange resin from the Dow Chemical Company, in the $H^+$ form. A solution containing 42 g/L $H_2SO_4$ and 2.6 g U/L and 0.82 g Fe/L was allowed to pass through the resin at 1 BV/h (bed volume per hour) and ambient temperature (approximately 23° C.). Effluent was analyzed for U and Fe content by inductively coupled plasma/atomic emission spectroscopy (ICP/AES). After 9 hours (after 9 BV), the effluent concentration was <5 ppm U (by weight) while the acid was at the feed solution concentration. The resin became saturated after 17 BV where the resin loading was 36.3 g/L of uranium (36.3 g uranium per liter of resin) and 12.3 g/L of iron. The resin was considered to be saturated when the ratio of the concentration of uranium in the effluent to the concentration of uranium in solution (R) was 0.95:1 or higher. This was the loading capacity of the head column in a three column merry-go-round configuration (two on loading and one on regeneration).

After loading the resin, an alkaline wash was performed on the resin (steps (W) and (X)), using 2 BV of 2% by weight $NH_4OH$ in water at 1 BV/h, followed by a wash on the resin with 2 BV of deionized (DI) water at 1 BV/h.

EXAMPLE 2: REMOVAL OF URANIUM (STEPS (A) AND (B))

Elution was performed with a 6% $Na_2CO_3$ (by weight in water) solution at 1 BV/h, at ambient temperature (approximately 23° C.). After 8 BV, the elution fluid was changed from the $Na_2CO_3$ solution to water, for 3 BV at 1 BV/h. All of the eluate was collected in a series of consecutive samples. Each sample of eluate was analyzed for uranium content and iron content. The quantities "U" and "Fe" represent the weight of U or Fe in a single sample. The quantities "% U" and "% Fe" represent the cumulative total weight percent of the U or Fe eluted, based on the total weight of U or Fe loaded onto the resin in steps (R) and (S). The results were as follows:

Elution with $Na_2CO_3$ - Content of Consecutive Samples

| Eluent | Total (BV) | U (mg) | % U | Fe (mg) | % Fe |
|---|---|---|---|---|---|
| 6% $Na_2CO_3$ | 0.5 | 40 | 5.5% | 0.01 | 0.00% |
| 6% $Na_2CO_3$ | 1.0 | 205 | 33.8% | 0.00 | 0.00% |
| 6% $Na_2CO_3$ | 1.5 | 215 | 63.4% | 0.09 | 0.04% |
| 6% $Na_2CO_3$ | 2.0 | 81 | 74.6% | 0.06 | 0.06% |
| 6% $Na_2CO_3$ | 2.5 | 39 | 79.9% | 0.00 | 0.06% |
| 6% $Na_2CO_3$ | 3.0 | 31 | 84.2% | 0.09 | 0.10% |
| 6% $Na_2CO_3$ | 3.5 | 24 | 87.4% | 0.00 | 0.10% |
| 6% $Na_2CO_3$ | 4.0 | 17 | 89.8% | 0.00 | 0.10% |
| 6% $Na_2CO_3$ | 5.0 | 16 | 92.0% | 0.00 | 0.10% |
| 6% $Na_2CO_3$ | 6.0 | 6 | 92.9% | 0.00 | 0.10% |
| 6% $Na_2CO_3$ | 7.0 | 3 | 93.3% | 0.00 | 0.10% |
| 6% $Na_2CO_3$ | 8.0 | 1 | 93.4% | 0.00 | 0.10% |
| water | 11.0 | 1 | 93.5% | 0.00 | 0.10% |

In this elution with sodium carbonate, nearly all of the uranium (93.5%) was removed from the resin, while almost none (only 0.1%) of the iron was removed.

EXAMPLE 3: REMOVAL OF IRON (STEPS (C) AND (D))

After the performance of Example 2, the resin was then subjected to elution using 10% by weight solution of $H_2SO_4$ in water at 1 BV/h, at ambient temperature (approximately 23° C.). Samples were collected and analyzed as in Example 2. Results were as follows:

Elution with $H_2SO_4$

| Eluent | Sample (BV) | U (mg) | % U | Fe (mg) | % Fe |
|---|---|---|---|---|---|
| $H_2SO_4$ | 1.0 | 0.13 | 0.02% | 31 | 12.6% |
| $H_2SO_4$ | 2.0 | 0.00 | 0.02% | 50 | 32.9% |
| $H_2SO_4$ | 3.0 | 0.00 | 0.02% | 15 | 38.9% |
| $H_2SO_4$ | 4.0 | 0.00 | 0.02% | 8 | 41.9% |
| $H_2SO_4$ | 5.0 | 0.12 | 0.03% | 6 | 44.4% |
| $H_2SO_4$ | 6.0 | 0.06 | 0.04% | 6 | 46.8% |
| $H_2SO_4$ | 7.0 | 0.00 | 0.04% | 6 | 49.1% |
| $H_2SO_4$ | 8.0 | 0.10 | 0.06% | 6 | 51.4% |
| $H_2SO_4$ | 9.0 | 0.09 | 0.07% | 6 | 53.7% |
| $H_2SO_4$ | 10.0 | 0.18 | 0.09% | 6 | 56.0% |
| $H_2SO_4$ | 11.0 | 0.20 | 0.12% | 6 | 58.4% |
| $H_2SO_4$ | 12.0 | 0.10 | 0.13% | 6 | 60.7% |
| $H_2SO_4$ | 13.0 | 0.17 | 0.16% | 6 | 63.1% |
| $H_2SO_4$ | 14.0 | 0.16 | 0.18% | 6 | 65.5% |
| $H_2SO_4$ | 15.0 | 0.15 | 0.20% | 6 | 67.9% |
| $H_2SO_4$ | 16.0 | 0.12 | 0.22% | 6 | 70.2% |
| $H_2SO_4$ | 17.0 | 0.12 | 0.23% | 5 | 72.4% |
| $H_2SO_4$ | 18.0 | 0.12 | 0.23% | 5 | 74.4% |
| $H_2SO_4$ | 19.0 | 0.05 | 0.24% | 2 | 75.4% |
| $H_2SO_4$ | 20.0 | 0.06 | 0.24% | 4 | 76.8% |
| $H_2SO_4$ | 21.0 | 0.05 | 0.25% | 4 | 78.3% |
| $H_2SO_4$ | 22.0 | 0.04 | 0.26% | 4 | 79.7% |
| $H_2SO_4$ | 23.0 | 0.01 | 0.26% | 2 | 80.4% |
| $H_2SO_4$ | 24.0 | 0.01 | 0.26% | 2 | 81.2% |
| $H_2SO_4$ | 25.0 | −0.02 | 0.26% | 1 | 81.6% |
| $H_2SO_4$ | 26.0 | 0.02 | 0.26% | 2 | 82.3% |
| $H_2SO_4$ | 27.0 | 0.00 | 0.26% | 1 | 82.6% |
| $H_2SO_4$ | 28.0 | 0.02 | 0.26% | 2 | 83.3% |
| $H_2SO_4$ | 29.0 | 0.00 | 0.26% | 1 | 83.6% |

In this elution with sulfuric acid, almost no uranium (only 0.26%) was removed from the resin, while almost all of the iron (83.6%) was removed.

COMPARATIVE EXAMPLE C4: ATTEMPT TO RECOVER URANIUM

Resin was loaded with uranium and iron as in Preparative Example 1, except that only 10 BV of the uranium/iron solution was used for loading the resin. Then the Uranium removal process as in Example 2 was performed, except that the eluting solution, instead of sodium carbonate, was 8% by weight $NH_4CO_3$ in water. 80% of the uranium was removed by the eluting fluid, but an unacceptable precipitate formed during the process. No such precipitate was observed during Example 2.

COMPARATIVE EXAMPLE C5: ATTEMPT TO RECOVER URANIUM

Comparative Example C4 was repeated with the following differences: uranium and iron were loaded using 15 BV of the uranium/iron solution, and after loading, the resin was eluted with a solution of 6% by weight $NH_4CO_3$ in water. 71% of the uranium was removed, but a precipitate formed during the process.

The invention claimed is:

1. A process for recovering uranium comprising
   (A) bringing a solution (A) into contact with a resin (A) to produce a mixture of solution (B) comprising dissolved uranium and uranium-depleted resin (B), wherein the solution (A) is an aqueous solution comprising dissolved sodium carbonate, sodium bicarbonate, or a mixture thereof, and wherein the resin (A) is a strong acid cation exchange resin that comprises one or more cationic moiety that comprises uranium and one or more cationic moiety that comprises iron, and
   (B) separating the solution (B) from the resin (B);
   wherein the strong acid cation exchange resin is a polymer wherein 50 mole % or more of the polymerized units comprise one or more covalently bonded sulfonate group, and wherein the sulfonate group is present in protonated form, in a neutralized form involving one or more cations other than $H^+$, in ionic form, or in a mixture thereof.

2. The process of claim 1, wherein the process further comprises the steps, prior to step (A), of
   (W) bringing a solution (W) into contact with a resin (W) to produce a mixture of a solution (X) comprising water and sufficient ammonium hydroxide or sodium hydroxide to raise its pH to at least 8 and a resin (X),
      wherein the resin (W) is a strong acid cation exchange resin that comprises one or more cationic moiety that comprises uranium, one or more cationic moiety that comprises iron, and one or more cationic moiety that is a hydrogen atom,
      wherein the solution (W) is an aqueous solution that has pH of 8 or higher and that comprises dissolved NaOH or dissolved NH4OH or a mixture thereof;
   (X) separating the solution (X) from the resin (X); and
   (Y) after the step (X), using the resin (X) as the resin (A) in the step (A).

3. The process of claim 2, wherein the process further comprises the steps, prior to the step (W), of
   (R) bringing a solution (R) into contact with a resin (R) to produce a mixture of a uranium-depleted solution (S) and a resin (S) comprising uranium, wherein the solution (R) is an aqueous solution that comprises 30 to 200 g/L sulfuric acid and that comprises 1 to 50 g/L uranium, and wherein the resin (R) is a strong acid cation exchange resin,
   (S) separating the solution (S) from the resin (S);
   (T) after the step (S), using the resin (S) as the resin (W) in the step (W).

4. The process of claim 1, wherein the process further comprises the steps, prior to the step (A), of (R) bringing a solution (R) into contact with a resin (R) to produce a mixture of a uranium-depleted solution (S) and a resin (S) comprising uranium, wherein the solution (R) is an aqueous solution that comprises 30 to 200 g/L sulfuric acid and that comprises 1 to 50 g/L uranium, and wherein the resin (R) is a strong acid cation exchange resin;

(S) separating the solution (S) from the resin (S); and (T) after the step (S), using the resin (S) as the resin (A) in the step (A).

5. The process of claim 1, wherein the process further comprises the steps, after the step (A), of (C) bringing a solution (C) into contact with the resin (B) to produce a mixture of a solution (D) comprising iron and an iron-depleted resin (C), wherein the solution (C) is an aqueous solution that comprises dissolved $H_2SO_4$ and dissolved $Na_2SO_4$, and (D) separating the solution (D) from the resin (C).

6. The process of claim 1, wherein the process further comprises the steps, subsequent to the step (B), of (E) forming a mixture of a solution (E) and said solution (B), to form a mixture of a solution (F) comprising a metal carbonate and a precipitate (F) comprising a diuranate salt, wherein the solution (E) is an aqueous solution that comprises dissolved sodium hydroxide, dissolved ammonium hydroxide, or a mixture thereof; and (F) separating the solution (F) from the precipitate (F).

* * * * *